United States Patent
van den Berge et al.

(10) Patent No.: US 9,633,242 B2
(45) Date of Patent: Apr. 25, 2017

(54) COMBINED MULTIFUNCTIONAL RFID COMMUNICATION DEVICE

(71) Applicant: NXP B.V., Eindhoven (NL)

(72) Inventors: Bram van den Berge, Waalre (NL); Marc van Bakel, Hamont (BE); Oswald Moonen, Eindhoven (NL)

(73) Assignee: NXP B.V., Eindhoven (NL)

( * ) Notice: Subject to any disclaimer, the term of this patent is extended or adjusted under 35 U.S.C. 154(b) by 363 days.

(21) Appl. No.: 13/846,748

(22) Filed: Mar. 18, 2013

(65) Prior Publication Data
US 2013/0249675 A1 Sep. 26, 2013

(30) Foreign Application Priority Data
Mar. 22, 2012 (EP) .................................... 12160850

(51) Int. Cl.
*G06K 7/10* (2006.01)
*G06K 7/00* (2006.01)
*H01F 38/14* (2006.01)

(52) U.S. Cl.
CPC ....... *G06K 7/10297* (2013.01); *G06K 7/0008* (2013.01); *H01F 38/14* (2013.01)

(58) Field of Classification Search
CPC .. G06K 7/0008; G06K 19/07749; G06K 7/04; H04B 5/0062; H04B 17/27;
(Continued)

(56) References Cited

U.S. PATENT DOCUMENTS 4,879,570 A * 11/1989 Takizawa ............. H01Q 1/3291
343/713
5,053,785 A * 10/1991 Tilston ................... H01Q 15/22
343/756
(Continued)

FOREIGN PATENT DOCUMENTS

DE  10 2004 038 685 A1  2/2006
EP        0496609 A1  1/1992
(Continued)

OTHER PUBLICATIONS

Extended European Search Report for Patent Appln. No. 12160850.9 (Aug. 27, 2012).

*Primary Examiner* — George Bugg
*Assistant Examiner* — Munear Akki

(57) ABSTRACT

There is described a device (100) for communicating with RFID-tags, the device (100) comprising (a) an antenna unit comprising a first antenna (110; 200) and a second antenna (120; 200), and (b) a controller (130) connected to the antenna unit. The controller (130) is adapted to sequentially feed different polling signals to the antenna unit such that corresponding signals are individually and simultaneously radiated by each of the first antenna (110; 200) and second antenna (120; 200). There is also described a home appliance comprising the aforementioned device (100). Furthermore, there is described a method for communicating with RFID-tags by an antenna unit comprising a first antenna (110; 200) and a second antenna (120; 200). The described method comprises sequentially feeding different polling signals to the antenna unit such that corresponding signals are individually radiated by each of the first antenna (110; 200) and second antenna (120; 200).

12 Claims, 2 Drawing Sheets

(58) Field of Classification Search
CPC .... G08B 13/2442; H01Q 7/00; H01Q 21/061; H01Q 1/125; H01Q 9/16
USPC ........... 340/10.1–10.4, 572.2, 572.7, 551; 343/375, 745, 748, 866, 893, 894, 793; 235/449, 475, 439
See application file for complete search history.

(56) References Cited

U.S. PATENT DOCUMENTS

| | | | |
|---|---|---|---|
| 5,500,651 | A | 3/1996 | Schuermann |
| 7,084,769 | B2 | 8/2006 | Bauer et al. |
| 7,592,898 | B1 | 9/2009 | Ovard et al. |
| 7,808,336 | B2 | 10/2010 | Simpson |
| 7,973,645 | B1 | 7/2011 | Moretti et al. |
| 8,446,256 | B2 * | 5/2013 | Pinkham ............... G06K 7/0008 340/10.1 |
| 2002/0161460 | A1 * | 10/2002 | Noguchi ............ A61B 1/00059 700/90 |
| 2004/0046642 | A1 | 3/2004 | Becker et al. |
| 2004/0090310 | A1 | 5/2004 | Hohberger et al. |
| 2004/0164864 | A1 * | 8/2004 | Chung .................... H04L 63/12 340/572.7 |
| 2005/0242959 | A1 | 11/2005 | Watanabe |
| 2006/0052055 | A1 * | 3/2006 | Rowse ................. G06K 7/0008 455/41.1 |
| 2006/0267730 | A1 | 11/2006 | Steinke et al. |
| 2008/0048862 | A1 | 2/2008 | Kritt et al. |
| 2008/0068174 | A1 * | 3/2008 | Al-Mahdawi ........ H04B 5/0062 340/572.7 |
| 2008/0283585 | A1 * | 11/2008 | Peterman ................ D06F 33/02 235/375 |
| 2009/0073070 | A1 * | 3/2009 | Rofougaran ......... H04B 5/0012 343/793 |
| 2009/0102610 | A1 | 4/2009 | Lance |
| 2011/0046438 | A1 * | 2/2011 | Iwaisako ............. A61B 1/00029 600/101 |
| 2011/0260839 | A1 * | 10/2011 | Cook ................. G06K 19/0708 340/10.4 |
| 2012/0212330 | A1 * | 8/2012 | Halberthal ............. A61B 19/44 340/10.1 |

FOREIGN PATENT DOCUMENTS

| | | |
|---|---|---|
| JP | 2004-227315 A | 8/2004 |
| KR | 2007-0091390 A | 9/2007 |
| KR | 2008-0075653 A | 8/2008 |
| KR | 2009-0020935 A | 2/2009 |

* cited by examiner

COMBINED MULTIFUNCTIONAL RFID COMMUNICATION DEVICE

CROSS-REFERENCE TO RELATED APPLICATIONS

This application claims the priority under 35 U.S.C. §119 of European patent application no. 12160850.9, filed on Mar. 22, 2012, the contents of which are incorporated by reference herein.

FIELD OF THE INVENTION

The present invention relates to the field of communication with RFID-tags, e.g. within a home appliance, such as a washing machine or a refrigerator.

ART BACKGROUND

Modern home appliances or white good devices tend to incorporate an increasing amount of smartness. One possible future smart aspect of home appliances could be the ability to adapt its behavior to particular content, i.e. to the items that are within the home appliance. A washing machine, for example, may be able to adapt its washing program in accordance with the particular laundry that is supplied to the machine and the kind of detergent that is intended to be used.

For such a washing machine, at least two communications with the physical world would be necessarily foreseen. In order to calculate the optimal washing program, the machine needs to obtain information on at least (a) the characteristics of the particular laundry and (b) the washing powder or detergent. If necessary, the machine could prompt the user to apply a different washing powder or to remove some clothes or other items of laundry that are not compatible with the calculated program.

One way for the washing machine to obtain the needed information could be to read it from RFID-tags attached e.g. to the respective pieces of laundry and to the detergent box or container. The RFID-tags or labels of the respective pieces of laundry would then have to contain corresponding typical fabric characteristics, like washing and ironing instructions. Similarly, the RFID-tag of the detergent box would have to contain information identifying the particular detergent product and its characteristics.

When the pieces of laundry are supplied into the machine, an RFID-reader could detect each corresponding tag and read the data contents of the tag. Similarly, the box with washing powder could be held close to another RFID reader to let the machine know the kind of detergent that is intended to be used.

For obtaining these two information streams, the machine would need two antennas, e.g. a standard NFC (Near Field Communication) antenna like the ones applied in standard card readers to read the RFID-tag of the detergent box, and another antenna provided around the entrance opening of the machine to read the tags of the laundry items. These antennas are connected to respective dedicated reader ICs which are subsequently connected to a control unit.

U.S. Pat. No. 7,973,645 B1 describes an RFID reader device connected to a plurality of RFID antenna modules and comprising an RF signal generator and a select signal generator. The select signal generator is operable to select one or more of the plurality of RFID antenna modules.

There may be a need for a simple and inexpensive way for e.g. a home appliance or white good device to communicate with RFID-tags of various items.

SUMMARY OF THE INVENTION

This need may be met by the subject matter according to the independent claims. Advantageous embodiments of the present invention are described by the dependent claims.

According to a first aspect there is provided a device for communicating with RFID-tags. The described device comprises (a) an antenna unit comprising a first antenna and a second antenna, and (b) a controller connected to the antenna unit. The controller is adapted to sequentially feed different polling signals to the antenna unit such that corresponding signals are individually and simultaneously radiated by each of the first antenna and second antenna.

This aspect is based on the idea that a single controller feeds a sequence of different polling signals to the antenna unit such that both the first antenna and the second antenna simultaneously radiate corresponding polling signals. In other words, both the first antenna and the second antenna radiate an identical sequence of different polling signals simultaneously, i.e. in parallel. Thereby, if an RFID-tag is placed within range of either of the first antenna and the second antenna, the RFID-tag may at some point during the sequence receive a polling signal to which the particular RFID-tag is sensitive.

In the present context, the term "RFID-tag" may particularly denote a device (in the shape of e.g. a sticker, button, batch or card) which is capable of being powered by an electromagnetic field or wave. Different from a corresponding reader (e.g. in a fixed environment or in a mobile phone), an RFID-tag does have its own power supply.

In the present context, the term "sequence of different polling signals" may particularly denote a series of at least two different polling signals which are generated (i.e. fed to the antenna unit or radiated by the first antenna and by the second antenna of the antenna unit) at different points in time. These different points in time may preferably be separated by an amount of time which is sufficient to transmit one of the different polling signals and to allow an RFID-tag to react to the polling signal. The sequence of polling signals may be a random sequence or a predetermined sequence. In case of a predetermined sequence, the sequence is preferably repeated after each completion of the sequence. The different polling signals are preferably designed for polling different RFID-tags or types of RFID-tags.

In the present context, the term "antenna" may particularly denote a component which is capable of radiating an electromagnetic wave in response to an electric current fed to the component and of generating an electric current in response to receiving an electromagnetic wave. More specifically, one antenna may be designed to be responsive to one particular polling signal.

The first antenna and the second antenna are preferably designed for communication with RFID-tags. In particular, the first antenna and/or the second antenna may comprise a single antenna coil or a plurality of antenna coils.

At least one of the first antenna and the second antenna may further be designed for communication with a smartphone or another device comprising an NFC reader.

The controller preferably comprises a processing unit, such as a CPU. Further, the controller preferably comprises a memory unit with a volatile memory, such as RAM, and/or a non-volatile memory, such as ROM. The memory unit preferably stores data and/or program code as needed for feeding the sequence of polling signals to the antenna unit and, if necessary, for performing any further functions.

According to a further embodiment, the first antenna and the second antenna are connected in series.

By connecting the first antenna and the second antenna in series, the controller may easily feed the sequence of different polling signals to both the first antenna and the second antenna via suitable connection terminals of the antenna unit. Even if the antenna unit is extended to comprise one or more further antennas (i.e. a third antenna, a fourth antenna and/or a fifth antenna etc.), this ease of feeding the sequence of polling signals to each antenna of the antenna unit may be maintained by connecting all antennas in series.

Furthermore, as the series connection of the first antenna and the second antenna may be seen as constituting a single antenna, i.e. the antenna unit, the controller can easily be tuned to the antenna unit.

According to a further embodiment, the first antenna and the second antenna are displaced relative to each other.

By displacing the first antenna and the second antenna relative to each other, i.e. by arranging the first antenna at a first location and arranging the second antenna at a second location, the sequence of polling signals can be radiated in different areas such that an RFID-tag present in one of these different areas can be polled by the device.

Thereby, the device comprising the controller and the displaced first antenna and second antenna requires less hardware in comparison to an arrangement of two separate devices each comprising its own antenna and a dedicated controller.

According to a further embodiment, the first antenna and the second antenna are connected by a twisted pair of wires or another connection which is not itself capable of acting as an antenna.

In the present context, the connection of the first antenna and the second antenna by a "twisted pair of wires" may particularly denote that at least one wire connecting the antennas is twisted with another wire. In an exemplary configuration, a first terminal of the controller is connected to a first terminal of the first antenna, a second terminal of the first antenna is connected to a first terminal of the second antenna, and a second terminal of the second antenna is connected to a second terminal of the controller. In this exemplary configuration, the wire between the second terminal of the first antenna and the first terminal of the second antenna is twisted with one part (or section) of the wire between the second terminal of the second antenna and the second terminal of the controller, and the wire between the first terminal of the controller and the first terminal of the first antenna is twisted with another part (or section) of the wire between the second terminal of the second antenna and the second terminal of the controller.

By connecting the antennas of the antenna unit by a twisted pair of wires, adverse impact of electromagnetic noise or signals originating from nearby items, such as mobile telephones or computers, may be significantly reduced.

It should be noted that this effect may also be obtained by a pair of untwisted wires arranged very close to each other, e.g. within a shrink tube, such that the resulting area is small enough to prevent the wires from acting as an antenna. The untwisted pair of wires has a lower capacitance than a corresponding twisted pair of wires and may thus be beneficial in cases where the capacitance of a twisted pair of wires would be so high that it causes problems with regards to tuning of the controller to the antenna unit. This tuning problem particularly occurs when the total length of the wires exceeds a certain value.

According to a further embodiment, at least one of the first antenna and the second antenna comprises a first sub-antenna and a second sub-antenna, the first sub-antenna and the second sub-antenna being connected in series and having different orientations.

In the present context, the term "sub-antenna" may particularly denote a component which forms part of an antenna (as defined above in connection with the first aspect) and is designed to be responsive to the same particular polling signal as the antenna of which is forms part.

In the present context, the orientation of the first sub-antenna and of the second sub-antenna may in particular relate to the respective radiation patterns of the sub-antennas. Accordingly, the definition that the first sub-antenna and the second sub-antenna have different orientations implies that said sub-antennas radiate in different directions or at least with different radiation patterns.

By connecting the differently orientated first sub-antenna and second sub-antenna in series, a given polling signal may be radiated simultaneously in two different directions. Thereby, an RFID-tag may be able to receive the polling signal even if the RFID-tag is positioned such that its antenna is not particularly sensitive in one of the two different directions.

According to a further embodiment, the first sub-antenna comprises a loop extending in a first plane, and the second sub-antenna comprises a loop extending in a plane perpendicular to the first plane.

With this configuration, the first sub-antenna will radiate in a direction perpendicular to the direction of radiation of the second sub-antenna. Accordingly, if an RFID-tag is placed within range of both the first and the second sub-antenna but in such a way that its antenna is not sensitive to the radiation from e.g. the first sub-antenna, the antenna of the RFID-tag will most likely have a relatively high sensitivity to the radiation from the second sub-antenna.

According to a further embodiment, at least one of the first antenna (110; 200) and the second antenna (120; 200) comprises a first sub-antenna (210, 220, 222, 230, 232) and a second sub-antenna (210, 220, 222, 230, 232), the first sub-antenna (210, 220, 222, 230, 232) and the second sub-antenna (210, 220, 222, 230, 232) being connected in series and having equal orientations.

By providing a first sub-antenna and a second sub-antenna having equal orientations, said sub-antennas may cooperate to generate a strong field in one direction.

This may in particular be achieved by arranging the first sub-antenna and the second sub-antenna in parallel planes and by assuring that current runs in the same direction around a common axis extending through the parallel planes.

According to a further embodiment, the controller is further adapted to (a) detect a response to a polling signal from a responding RFID tag, and (b) when a response to a polling signal is received, perform communication with the responding RFID tag.

As described above, the controller waits a certain amount of time after each polling signal to see if a response is received from an RFID-tag which is responsive to the particular polling signal. If this occurs, i.e., a response from an RFID-tag is received, the controller aborts the sequential feeding of polling signals to the antenna unit and switches to a communication mode. In the communication mode, a one- or bi-directional data exchange between the device and the RFID-tag is performed by the controller.

According to a further embodiment, each of the different polling signals corresponds to one of a plurality of RFID communication protocols.

Thereby, the device may be capable of communicating with a variety of different types of RFID-tags. This may be particularly advantageous in the case where the first antenna and the second antenna are arranged at different positions at which different types of RFID-tags are expected or intended to be detected. In such case, the antenna unit and the single controller is capable of fulfilling the same functions as separate devices dedicated to each type of RFID-tag.

According to a further embodiment, the plurality of RFID protocols may preferably comprise (a) ISO/IEC 14443 p3a, (b) ISO/IEC 14443 p3b, (c) ISO/IEC 14443 p4, (d) ISO/IEC 14443 p4a, (e) ISO/IEC 15693, (f) ISO/IEC 18092, and/or (g) "FeliCa".

According to a second aspect, there is provided a home appliance. The described home appliance comprises a device according to the first aspect or any of the further embodiments thereof.

The home appliance, also referred to as white good device, may be a washing machine, a refrigerator, a stove, a freezer, or any similar device which may benefit from information on items or products with which it is to interact.

In a washing machine, for example, a device according to the first aspect or any of the embodiments thereof as described above could be installed such that the first antenna is preferably arranged around or in the vicinity of the opening of the machine. Thereby, the first antenna will be able to communicate with RFID-tags of items of laundry that are fed through the opening of the washing machine. The second antenna is preferably arranged on the side of the machine or in the vicinity of the detergent drawer. Thereby, the second antenna will be able to communicate with an RFID-tag of e.g. a product box or bag containing detergent or fabric softener. Furthermore, the second antenna may also be used for transmitting service or maintenance data to a smartphone or another service device equipped with an NFC reader.

Thereby, by equipping a washing machine with a simple device, which may be easy and cheap to manufacture, the washing machine may be capable of registering relevant data of the laundry items, such as washing temperature, maximum centrifugal speed, recommended type of detergent, special program information, and the like.

Furthermore, the washing machine may be capable of registering data relating to detergent and/or softener which is filled into or intended to be filled into the machine. Using this information, the washing machine may be able to select an optimal washing program. Furthermore, in case of a mismatch between the laundry items and detergent or in case different kinds of laundry, such as e.g. wool and synthetic fabric, are mixed in the drum of the machine, the machine may output a corresponding warning to the user or even block operation of the machine.

Even further, the washing machine (or another white good device) may be provided with options to use remote controls. For example, a mobile phone could interact with the white good device to get paired via an NFC reader and might thereafter be used to remotely control the operation of the white good device. The mobile phone, such as a smartphone, may also or alternatively be used to receive service/maintenance data from the washing machine. The latter function may also be provided by a dedicated service device.

According to a third aspect, there is provided a method for communicating with RFID-tags by an antenna unit comprising a first antenna and a second antenna. The described method comprises (a) sequentially feeding different polling signals to the antenna unit such that corresponding signals are individually and simultaneously radiated by each of the first antenna and second antenna.

This aspect may be based on the idea that a sequence of different polling signals is fed to the antenna unit, which may be achieved by a single controller, such that both the first antenna and the second antenna simultaneously radiate corresponding polling signals. In other words, both the first antenna and the second antenna may radiate an identical sequence of different polling signals simultaneously, i.e. in parallel. Thereby, if an RFID-tag is placed within range of either of the first antenna and the second antenna, the RFID-tag may receive a polling signal to which the particular RFID-tag is sensitive.

The method may preferably be implemented in a device according to the first aspect and any of the embodiments thereof as described above.

According to a fourth aspect, there is provided a computer program comprising computer executable instructions which when executed by a computer causes the computer to perform the steps of the method according to the third aspect.

According to a fifth aspect, there is provided a computer program product comprising a computer readable data carrier loaded with a computer program according to the fourth aspect.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular of features of the method type claims and features of the apparatus type claims, is considered to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment to which the invention is, however, not limited.

DETAILED DESCRIPTION

Figure 1:
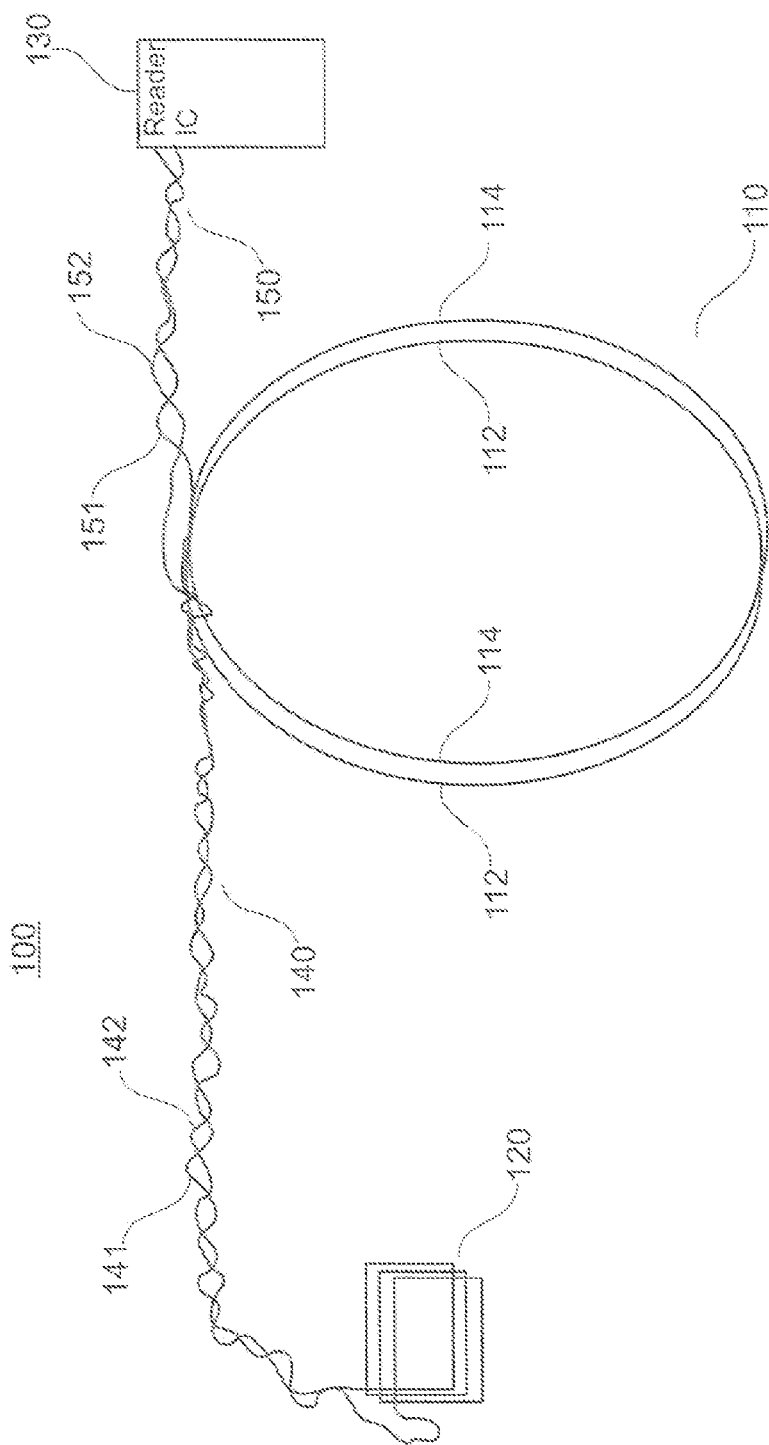
FIG. 1 shows a device for communicating with RFID-tags in accordance with an embodiment.

The illustration in the drawing is schematically. It is noted that in different figures, similar or identical elements are provided with the same reference signs or with reference signs, which are different from the corresponding reference signs only within the first digit.

FIG. 1 shows a device 100, e.g. a reader or an RFID-tag reader, for communicating with RFID-tags. The device 100 comprises a first antenna 110, a second antenna 120 and a reader IC (controller) 130. The first antenna 110 is formed as circular loop antenna comprising a first loop 112 and a second loop 114. The second antenna 120 is formed as a rectangular loop antenna comprising three rectangular loops. The reader IC 130 comprises a processing unit (not shown) and a memory unit (not shown) if necessary for controlling the operation of the antennas 110 and 120. The reader IC may further comprise an interface for communicating with a main controller of an apparatus in which the device 100 is implemented. Such an apparatus may e.g. be a white goods device, such as a washing machine, comprising a corresponding main controller.

The first antenna 110 and the second antenna 120 are connected in series between two terminals of the reader IC 130. The interconnection of the first antenna 110, the second antenna 120 and the reader IC 130 is constituted by a first twisted pair of wires 140 and a second twisted pair of wires 150. More specifically, wire 151 connects one terminal of the reader IC 130 to an input terminal of the first antenna, and wire 141 connects an output terminal of the first antenna 110 to an input terminal of the second antenna 120. Further, wire 142 connects an output terminal of the second antenna 120 to a second terminal of the reader IC 130 via wire 152. The wires 142 and 152 are joined in the vicinity of the first antenna 110 or constitute respective sections of one continuous wire. Thus, a current feed to the wire 151 will run though the first antenna 110, continue through wire 141, then run through the second antenna 120, and finally run back to the reader IC through wires 142 and 152.

In operation of the device 100, the reader IC repeatedly feeds a sequence of different polling signals to the series connected first antenna 110 and second antenna 120. The sequence of polling signals is designed such as to include sufficient time between each polling signal for detecting a possible response from an RFID-tag. If a response is detected, the reader IC switches to a communication mode and performs corresponding data communication with the responding RFID-tag. After finalizing the data communication, the reader IC may return to feeding the sequence of polling signals.

Accordingly, the device 100 is capable of performing data communication with RFID-tags that are positioned in the vicinity of the first antenna 110 or the second antenna 120 by a single reader IC 130 without the need for antenna switches.

The first antenna 110 may preferably be designed for arrangement at or around the door of a washing machine (through which door dirty laundry is to be filled into the machine). The second antenna 120 may preferably be designed for arrangement at a side wall of the washing machine close to the drawer or container into which detergent and/or fabric softener is to be provided. The reader IC 130 is preferably designed to communicate with a washing machine controller, thereby allowing the latter to process data read from RFID-tags which have reacted to polling signals from the first antenna 110 and the second antenna 120.

It is explicitly noted that the device 100 is not limited to two antennas but may easily be expanded to include one or more further antennas connected in series with the first antenna 110 and the second antenna 120.

Figure 2:
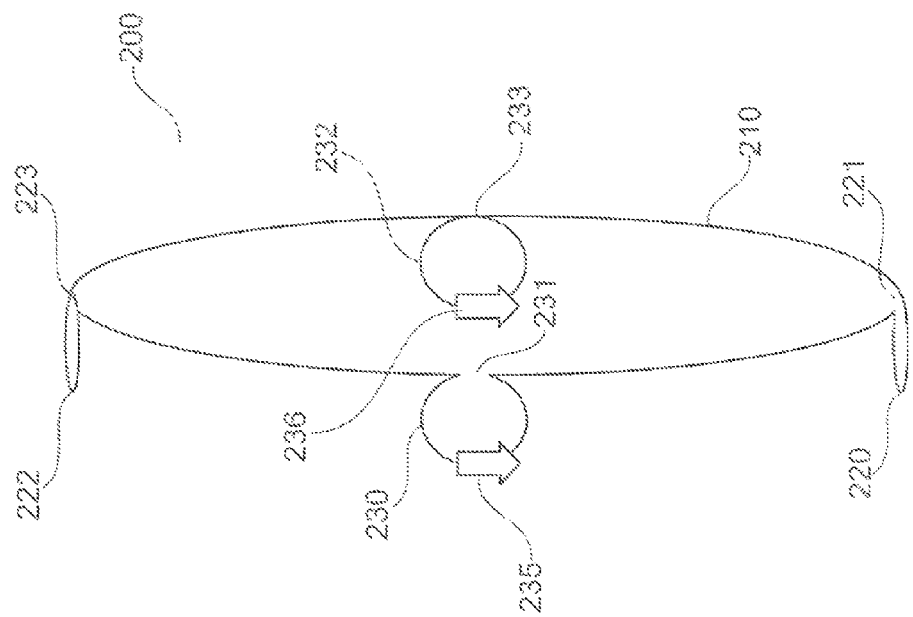
FIG. 2 shows an antenna for a device for communicating with RFID-tags in accordance with an embodiment.

FIG. 2 shows an antenna 200 for a device for communicating with RFID-tags, such as the device 100 shown in FIG. 1. The antenna 200 is formed as a main loop 210 with branched-off sub-loops 220, 222, 230 and 232. The upper sub-loop 222 and the lower sub-loop 220 extend in parallel planes. Similarly, the left sub-loop 230 and the right sub-loop 232 extend in parallel planes. The latter parallel planes are perpendicular to the parallel planes of the upper sub-loop 222 and lower sub-loop 220. Accordingly, the fields generated by the upper sub-loop 222 and the lower sub-loop 220 are perpendicular to the fields generated by the left sub-loop 230 and the right sub-loop 232. In other words, the orientation of each of the left sub-loop 230 and the right sub-loop 232 is perpendicular to the orientation of each of the upper sub-loop 222 and the lower sub-loop 220. Similarly, the orientations of all sub-loops 220, 222, 230 and 232 are perpendicular to the orientation of the main loop 210.

As indicated by arrows 235 and 236, the direction of current in the left-most part of the left sub-loop 230 and in the left-most part of the right sub-loop 232 is the same. This is preferably achieved by forming the left sub-loop 230 to comprise a slight opening 231 where it is branched-off from the main loop 210, i.e. by steeply bending the wire of the antenna 200 upwards at the opening 231. On the other hand, the right sub-loop 232 is formed by crossing the wire of the antenna 200 at the point 233. As a result, the left sub-loop 230 and the right sub-loop 232 cooperate to produce a strong field in one direction. Similarly, the lower sub-loop 220 comprises a slight opening 221 whereas the upper sub-loop 222 comprises a crossing wire at the point 223.

As a result, the antenna 200 produces a non-homogenous field and is accordingly capable of communicating with RFID-tags independently of the orientation of the RFID-tag relative to the antenna 200.

It is noted that the use of the terms "upper", "lower", "left", and "right" refers solely to the orientation of the corresponding drawing.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

The invention claimed is:

1. Device for communicating with RFID-tags, the device comprising:
    an antenna unit configured and arranged for an appliance and comprising a first antenna and a second antenna spatially displaced from each other and connected in series by a twisted pair of wires, and
    a controller circuit connected to the antenna unit and configured for communication with the appliance,
    wherein the controller circuit is adapted to sequentially feed different polling signals to the antenna unit, with time between the sequentially fed different polling signals for detecting possible responses from the respective ones of the RFID-tags, by feeding a current that runs through each of the first antenna and second antenna such that the first antenna and the second antenna simultaneously radiate each of the sequentially fed different polling signals, and by detecting one of the possible responses the controller circuit further communicates data via at least one of the RFID-tags on behalf of the appliance.

2. Device according to claim 1, wherein
    the first antenna and the second antenna are connected by a conductor which, by itself, is not configured to radiate signals in response to the controller circuit, for communicating with one or more of the RFID-tags.

3. Device according to claim 1, wherein
    at least one of the first antenna and the second antenna comprises a first sub-antenna and a second sub-antenna, the first sub-antenna and the second sub-antenna being connected in series and having different orientations.

4. A device for communicating with RFID-tags, the device comprising:
   an antenna unit configured and arranged for an appliance and comprising a first antenna and a second antenna, and
   a controller circuit connected to the antenna unit and configured for communication with the appliance,
   wherein the controller circuit is adapted to sequentially feed different polling signals to the antenna unit such that corresponding signals are simultaneously radiated by each of the first antenna and second antenna
and wherein
   the first antenna comprises a loop extending in a first plane, and
   the second antenna comprises a loop extending in a plane perpendicular to the first plane.

5. Device according to claim 1, wherein
   at least one of the first antenna and the second antenna comprises a first sub-antenna and a second sub-antenna, the first sub-antenna and the second sub-antenna being connected in series and having equal orientations.

6. Device according to claim 1, wherein
   each of the different polling signals corresponds to one of a plurality of RFID communication protocols.

7. Device according to claim 6, wherein the plurality of RFID protocols comprises two or more protocols selected from the group consisting of:
   ISO/IEC 14443 p3a,
   ISO/IEC 14443 p3b,
   ISO/IEC 14443 p4,
   ISO/IEC 14443 p4a,
   ISO/IEC 15693,
   ISO/IEC 18092, and
   "FeliCa".

8. A home appliance comprising
   a device according to claim 1.

9. Method for communicating with RFID-tags by an antenna unit configured and arranged for an appliance and comprising a first antenna and a second antenna, the method comprising:
   sequentially feeding different polling signals to the antenna unit, with time between the sequentially fed different polling signals for detecting possible responses from the respective ones of the RFID-tags, by feeding a current that runs through each of the first antenna and second antenna such that the sequentially fed different polling signals are simultaneously radiated by each of the first antenna and second antenna, and
   in response to detecting one of the possible responses the controller circuit communicates data via at least one of the RFID-tags on behalf of the appliance.

10. A non-transitory computer storage medium that stores executable instructions which when executed by a computer causes the computer to perform the method comprising:
   sequentially feeding different polling signals to an antenna unit, configured and arranged for an appliance and including a first antenna and a second antenna, by feeding a current that runs through each of the first antenna and second antenna such that the sequentially fed different polling signals are simultaneously radiated by each of the first antenna and second antenna, and
   in response to detecting one of the possible responses, communicating data via at least one of the RFID-tags on behalf of the appliance.

11. A device according to claim 1, further comprising:
   a first wire connected to a first terminal of the first antenna and to a first output terminal of the controller circuit;
   a second wire connected to a second terminal of the first antenna and to a first terminal of the second antenna; and
   a third wire connected to a second terminal of the second antenna and to a second output terminal of the controller circuit.

12. A device according to claim 11, wherein the controller circuit includes a processing circuit and a memory circuit.

* * * * *